United States Patent
He et al.

(10) Patent No.: US 7,438,976 B2
(45) Date of Patent: Oct. 21, 2008

(54) NANO-TALC POWDERS OF HIGH SPECIFIC SURFACE AREA OBTAINED BY HYBRID MILLING

(75) Inventors: Jianhong He, Irwin, PA (US); Christopher Dunn, North Huntingdon, PA (US)

(73) Assignee: NGX, Inc., Pittsburgh, PA (US)

( * ) Notice: Subject to any disclaimer, the term of this patent is extended or adjusted under 35 U.S.C. 154(b) by 0 days.

(21) Appl. No.: 10/890,852

(22) Filed: Jul. 14, 2004

(65) Prior Publication Data

US 2004/0241442 A1 Dec. 2, 2004

(51) Int. Cl.
*B32B 5/10* (2006.01)
(52) U.S. Cl. .................................. 428/402; 423/331
(58) Field of Classification Search ................ 423/331; 428/402
See application file for complete search history.

(56) References Cited

U.S. PATENT DOCUMENTS

| | | | | |
|---|---|---|---|---|
| 2,844,486 | A * | 7/1958 | Lamar | 244/16 |
| 3,787,330 | A * | 1/1974 | Sugahara et al. | 502/72 |
| 4,176,137 | A * | 11/1979 | Platz et al. | 502/234 |
| 4,325,514 | A | 4/1982 | Hemingsley | |
| 4,391,733 | A | 7/1983 | Lamar et al. | |
| 4,430,249 | A | 2/1984 | Gate | |
| 4,770,894 | A * | 9/1988 | Usui et al. | 426/655 |
| 4,793,985 | A | 12/1988 | Price et al. | |
| 4,845,191 | A | 7/1989 | Hautier | |
| 4,957,554 | A * | 9/1990 | Mathers et al. | 106/35 |
| 5,120,365 | A * | 6/1992 | Kogler | 106/415 |
| 5,401,482 | A * | 3/1995 | Clauss et al. | 423/331 |
| 5,601,875 | A | 2/1997 | Palm | |
| 6,348,536 | B1 | 2/2002 | Fourty et al. | |
| 6,478,865 | B1 | 11/2002 | Malla | |
| 6,610,136 | B2 | 8/2003 | Malla | |
| 6,783,631 | B2 * | 8/2004 | Schulz | 162/181.1 |
| 7,249,723 | B2 * | 7/2007 | He et al. | 241/21 |
| 2003/0234304 | A1 * | 12/2003 | Miao | 241/22 |
| 2006/0014880 | A1 * | 1/2006 | Zhong et al. | 524/451 |
| 2006/0040102 | A1 * | 2/2006 | Li et al. | 428/402 |
| 2006/0086837 | A1 * | 4/2006 | He et al. | 241/22 |

OTHER PUBLICATIONS

Khodakov, Edelman, "Experimental Investigations of Spontaneous Dispersion in Molecularly Compact Soliod Aggregates," Kolloidnyl Zhurnal, Sep.-Oct. 1969, pp. 771-776, vol. 31, No. 5 Plenum Publishing Corporation, New York, NY.

Khodakov, Rebinder, "The Effect of the Medium in the Fine Dispersion of Solids", Kolloidnyl Zhurnal, 1960, pp. 365-375, vol. 22, No. 3 The Academy of Sciences of the USSR Press, Moscow, USSR.

* cited by examiner

*Primary Examiner*—H. T Le
(74) *Attorney, Agent, or Firm*—Debra M. Parrish, PC

(57) ABSTRACT

The invention provides high surface area talc compositions by a novel hybrid milling method or soaking method. The hybrid milling method comprises dry milling talc powder followed by mixing with water and wet milling to provide a nano-talc slurry with high surface area, also of the invention. The soaking method comprises dry milling talc powder followed by mixing with water and soaking the powder for a period of time to provide high surface area nano-talc slurry, also of the invention. The slurry may be dewatered and dried to provide dry nano-talc powder. The nano-talc powder provided by the invention is a novel hydrophilic talc composition also of the invention.

10 Claims, 7 Drawing Sheets

NANO-TALC POWDERS OF HIGH SPECIFIC SURFACE AREA OBTAINED BY HYBRID MILLING

BACKGROUND OF INVENTION

1. Field of Invention

The invention relates to new methods for the comminution of minerals to sub-micron particle sizes that are especially relevant to the processing of talc powders.

2. Description of Related Art

It is a well-known process to grind minerals in a ball mill in order to reduce the size of particles. This process, however, does not provide the ability to reduce the particle size of the majority of the particles below 2 microns equivalent spherical diameter. In order to produce particles with desirable properties, smaller particles are needed. In a modification to the traditional ball mill grinding method, U.S. Pat. No. 3,604,634 teaches a grinding method wherein an aqueous solution of at least 25 percent by weight of calcium carbonate is ground with a particulate grinding material long enough to dissipate at least 250 horsepower hours of energy per ton. According to the patent disclosure, sixteen hours of grinding using that process yielded a finished product with 97% of the particles smaller than 2 microns and 32% of the finished particles smaller than 500 nanometers.

Due to problems with spontaneous crystal dissolution-recrystallization in situations where the aqueous solution was overly saturated, U.S. Pat. No. 4,265,406 taught the addition of additives to the solution in order to reduce the particle size and thus increase the relative surface area of the powder.

In U.S. Pat. No. 4,325,514 ("the '514 patent"), comminution is referenced that can be performed either "wet or dry". The method of comminution is via ball-milling. That specification, however, actually teaches away from the instant invention by noting that the preferred grinding method is an aqueous slurry as opposed to a dry mixture. The '514 patent claims a method of comminuting materials involving a rotating impeller being forced through an aqueous slurry containing the subject material in solution.

Various inventive steps have subsequently made upon the basic slurry grinding model; however, the focus was on dispersing the particles for better grinding on centrifuging them in order to obtain uniformity in size. See, for example, U.S. Pat. No. 4,793,985 to Price, et. al. and U.S. Pat. No. 4,845,191 to Hautier.

Virtually all of the aforementioned slurry grinding methods have the disadvantages of a large number of steps, complicated equipment and/or addition of additives. We have found a novel method for comminuting minerals to very small particle size that is especially useful in the comminution of talc powders.

SUMMARY OF INVENTION

In one embodiment the invention is a method of providing an aqueous nano-talc slurry with a specific surface area of 70 $m^2/g$ to about 500 $m^2/g$ comprising dry milling talc powder for a period of time to provide a talc powder with specific surface area of about 40 $m^2/g$ to about 130 $m^2/g$; mixing the talc powder with a specific surface area of about 40 $m^2/g$ to about 130 $m^2/g$ with about 2 to about 20 parts water to provide a talc slurry, and soaking for a period of time, or, wet milling for a period of time, to provide an aqueous nano-talc slurry with specific surface area of about 70 $m^2/g$ to about 500 $m^2/g$.

Another embodiment of the invention is a hydrophilic nano-talc composition consisting essentially of talc powder with a specific surface area of about 70 $m^2/g$ to about 500 $m^2/g$. The hydrophilic nano-talc composition is further characterized by absorbing about 5 to about 15 wt % talc powder water at about 40% to about 60% relative humidity.

Another embodiment of the invention is a hydrophilic nano-talc slurry comprising about 5 to about 30 wt % talc powder and about 70 to 95 wt % water, wherein the talc powder has a specific surface area of about 70 $m^2/g$ to about 500 $m^2/g$. The hydrophilic nano-talc slurry is further characterized by remaining suspended over a period of 1 month to about 3 months

DETAILED DESCRIPTION OF INVENTION

Talc is a naturally occurring mineral, a layered hydrous magnesium silicate of general empirical formula $Mg_3Si_4O_{10}(OH)_2$, that is broken up and usually ground to a fine powder. Talc is a white, apple green, gray powder with luster pearly or greasy with a Mohs hardness of 1-1.5. It has a high resistance to acids, alkalies and heat. The hydroxy groups normally are internal to the magnesium layer and are not accessible to water except at the edges of the silicate sheet. Thus, conventional talc powder is a hydrophobic material that easily blends and disperses with organic media including polymers but is not easily dispersed in aqueous solvents. The talc powder used in the milling process of the invention may be any commercial talc derived from natural sources. The talc initial particle size is not of great importance, but preferably the initial median particle size is about 0.5 μm to about 10 μm and a specific surface area (SSA) of about 5 $m^2/g$ to about 20 $m^2/g$. Commercial samples of such a talc powder are the Luzenac America's NICRON® 674 (SSA 14 $m^2/g$), CIMPACT® 710 (SSA 14 $m^2/g$) and Specialty Minerals Inc. UltraTalc™ 609 (SSA 17 $m^2/g$).

Throughout the specification reference is made to the specific surface area (SSA) of the mineral powder. The SSA number corresponds to that derived from the BET surface area measurement that is described in J. Am. Chem. Soc., 60, 309 (1938) by Brunauer, Emmett and Teller. There are well known commercial instruments available that are used to measure the SSA using nitrogen as the gas absorbed. The SSA is used to monitor the progress of the dry milling and wet milling or soaking of the mineral powder.

Mechanical milling may be accomplished with any mill that provides high intensity, high energy pounding or grinding such as a vibratory mill, planetary mill, uniball mill or high energy ball mill. Alternative equipment e.g. hammer mill, sand milling, jet mill (steam or air), air classified mill (ACM) plus combination of milling and classification equipment may be used to provide a talc powder with a SSA of about 40 $m^2/g$ to about 130 $m^2/g$. Preferred mills for the process are Attritor mills that have a plurality of small solid balls as the grinding media, about 0.2 mm to about 10 mm in diameter, and preferably about 3 mm to about 6 mm. The media may be steel or ceramic balls. Preferably the media is selected from the group of carbon steel, stainless steel, tungsten carbide, ceria stabilized zirconia oxide, zirconia silicate, alumina and yttria-stabilized zirconia balls. The ball to powder ratio and the speed of the mill are two important parameters that determine the energy delivered to the powder in the milling process. Preferably about a 10:1 to about 30:1 weight ratio of ball to powder is used and most preferably about a 20:1 ratio is used. The mill is generally run at about 100 to about 500 rpms.

The methods of the invention require in the first step a mechanical milling of the mineral in the dry state, that is, without liquid vehicles such as water, liquid nitrogen or organic solvents, or other media often used in grinding. The first stage milling is preferably done in air for a period of time necessary to provide a powder with an SSA of about 40 $m^2/g$ to about 130 $m^2/g$. This is usually accomplished in about 1 to 12 hours depending upon the SSA of the starting material and the milling conditions such as the energy input (KW/hour per unit material)

In the second step of the method of the invention the material is mixed with water to form an aqueous talc slurry. Any mixing method may be used. Water may be added to the mill and mixed gently to provide a uniform slurry or dry talc may be transferred to a separate mixing apparatus and mixed under a low shear environment to provide a uniform talc slurry. The water may be untreated tap water or de-ionized water, distilled water, softened water, or the like, but de-ionized water is preferred. The water may be at any temperature between freezing and boiling and water between about 10° C. and about 30° C. is preferred. The water may be slightly acidic or slightly basic with no detriment to the product or process. Preferred is water with a pH between about 3 and about 11 and more preferred is a pH of about 4 to about 10, and most preferred is a pH about 5 to about 10.

In one embodiment of the method of the invention, in the third step the aqueous talc slurry is wet milled for a period of time to provide an aqueous nano-talc slurry with an SSA between 70 $m^2/g$ to about 500 $m^2/g$. The time and temperature of wet milling may vary depending upon the surface area of the talc desired. This method of dry milling followed by wet milling with water is hereafter referred to as the hybrid milling method. The attributes of the hybrid milling method, compared with conventional dry milling or wet milling process are revealed in considering the data displayed in FIG. 1 thru FIG. 4.

Figure 1:
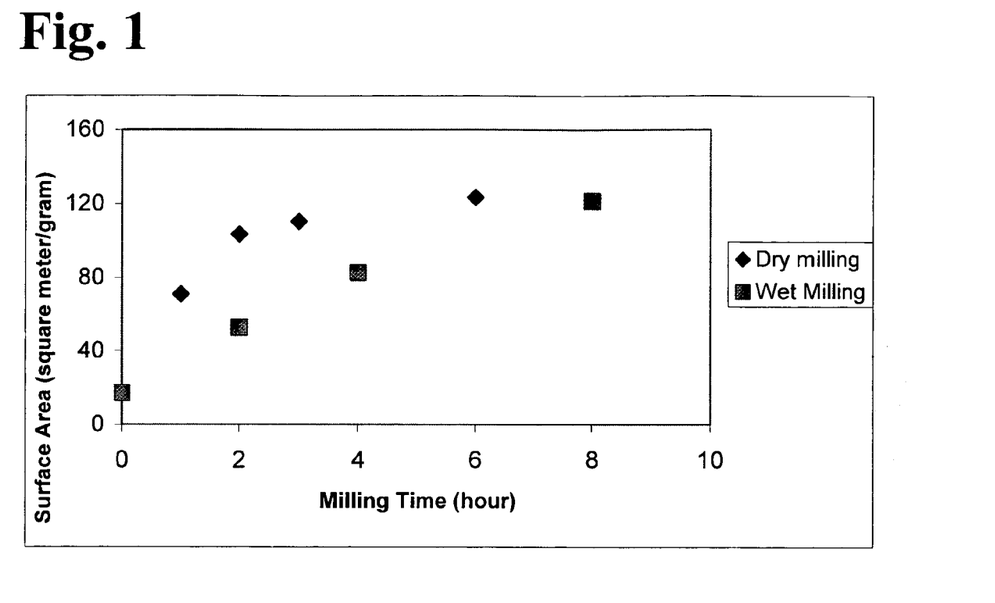
FIG. 1 illustrates the surface area of talc as a function of milling time for conventional one step process of dry milling or wet milling that acts as a control.

FIG. 1 plots the surface area of a talc as a function of milling time for a one step process of dry milling or wet milling that acts as a control. Under dry milling conditions the SSA of talc rises rapidly to a plateau of about 125 $m^2/g$ after 6 h. Under wet milling with water the SSA of talc rises gradually and reaches about 125 $m^2/g$ after 8 h.

Figure 2:
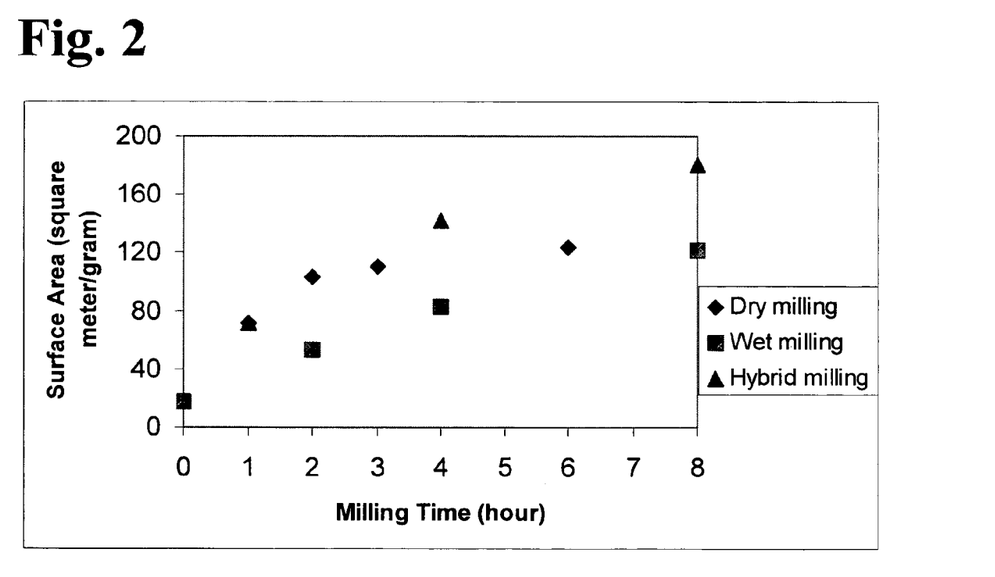
FIG. 2 compares the conventional dry and wet milling processes with the novel hybrid process of the invention wherein the talc is first dry milled for 1 hour.

FIG. 2 compares the conventional dry and wet milling process with a hybrid process of the invention wherein the talc is dry milled for 1 hour followed by wet milling for 3 and 7 h, respectively. The talc surface reaches 141.5 $m^2/g$ and 180.5 $m^2/g$ after 3 and 7 h wet milling, respectively.

Figure 3:
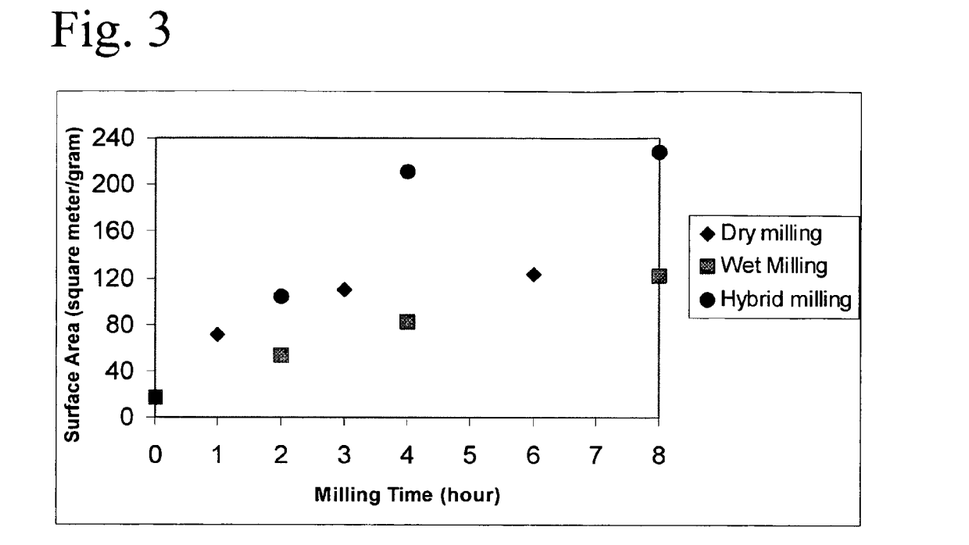
FIG. 3 compares the conventional dry and wet milling processes with a hybrid process of the invention wherein the talc is first dry milled for 2 hours.

FIG. 3 compares the conventional dry and wet milling process with a hybrid process of the invention wherein the talc is dry milled for 2 hours followed by wet milling for 2 and 6 h, respectively. The talc surface reaches 210.6 $m^2/g$ and 228.1 $m^2/g$ after 2 and 6 h wet milling, respectively.

Figure 4:
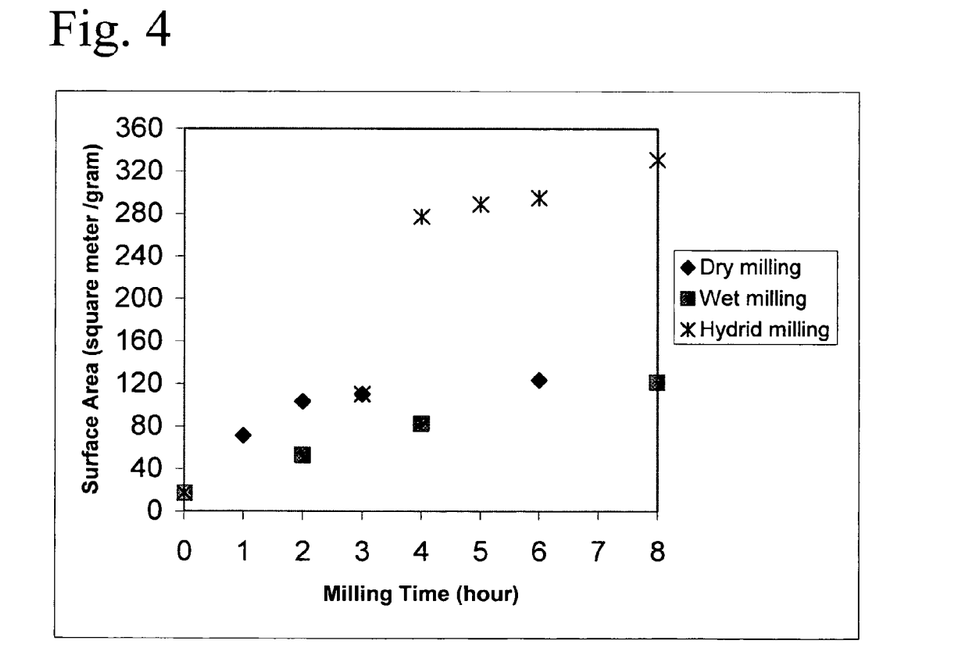
FIG. 4 compares the conventional dry and wet milling processes with a hybrid process of the invention wherein the talc is first dry milled for 3 hours.

FIG. 4 compares the conventional dry and wet milling process with a hybrid process of the invention wherein the talc is dry milled for 3 hours followed by wet milling for 1, 2, 3 and 5 h, respectively. The talc surface reaches 277.1 $m^2/g$ and 331 $m^2/g$ after 1 and 5 h wet milling, respectively. From these comparisons it is clear that the hybrid milling leads to significant increases in SSA of the talc slurry.

In another embodiment of the invention, in the third step the aqueous talc slurry is allowed to soak for a period of time to provide an aqueous nano-talc slurry with an SSA between 70 $m^2/g$ to about 500 $m^2/g$. The time and temperature of soaking may vary depending upon the surface area of the talc desired. Preferably soaking is done with some form of agitation such as stirring. This method of dry milling followed by soaking with water is hereafter referred to as the soaking method. The attributes of the soaking method are revealed in considering the data displayed in FIG. 5 wherein the talc is first dry milled for 2.5 hours.

Figure 6:
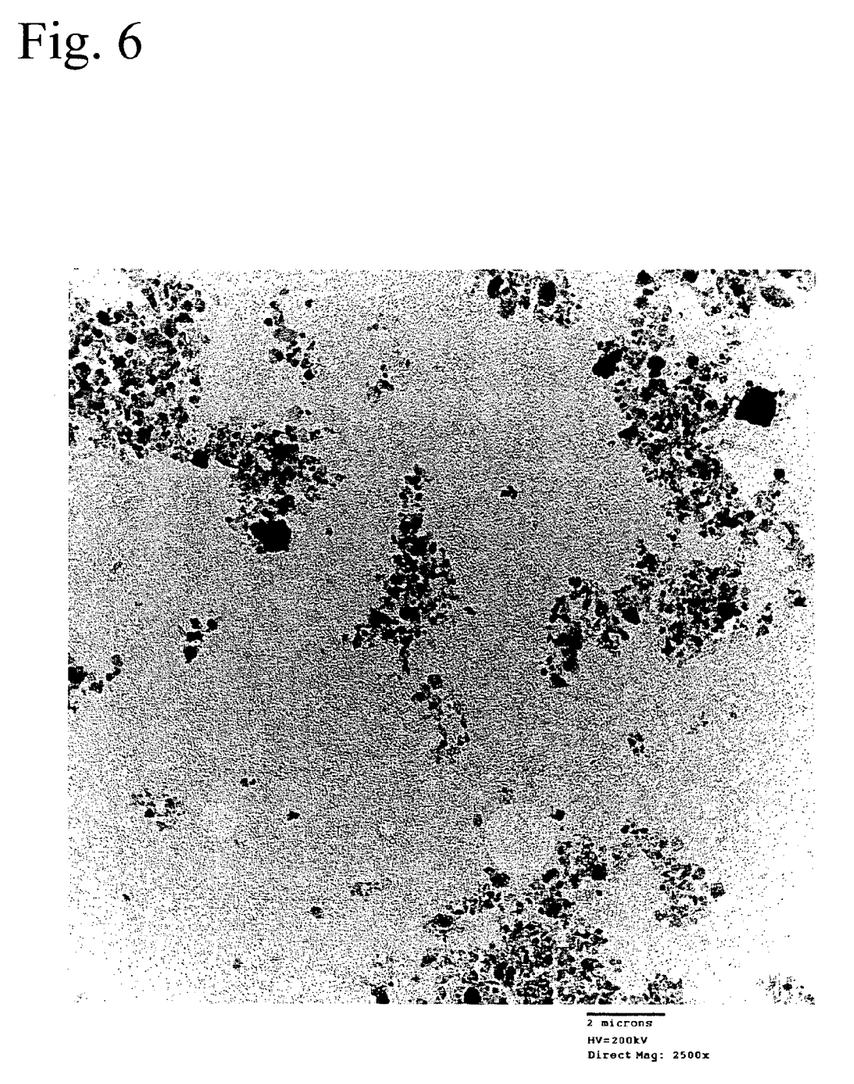
FIG. 6 shows a TEM wide field image of the hybrid milled talc powder at 2500× magnification.
Figure 7:
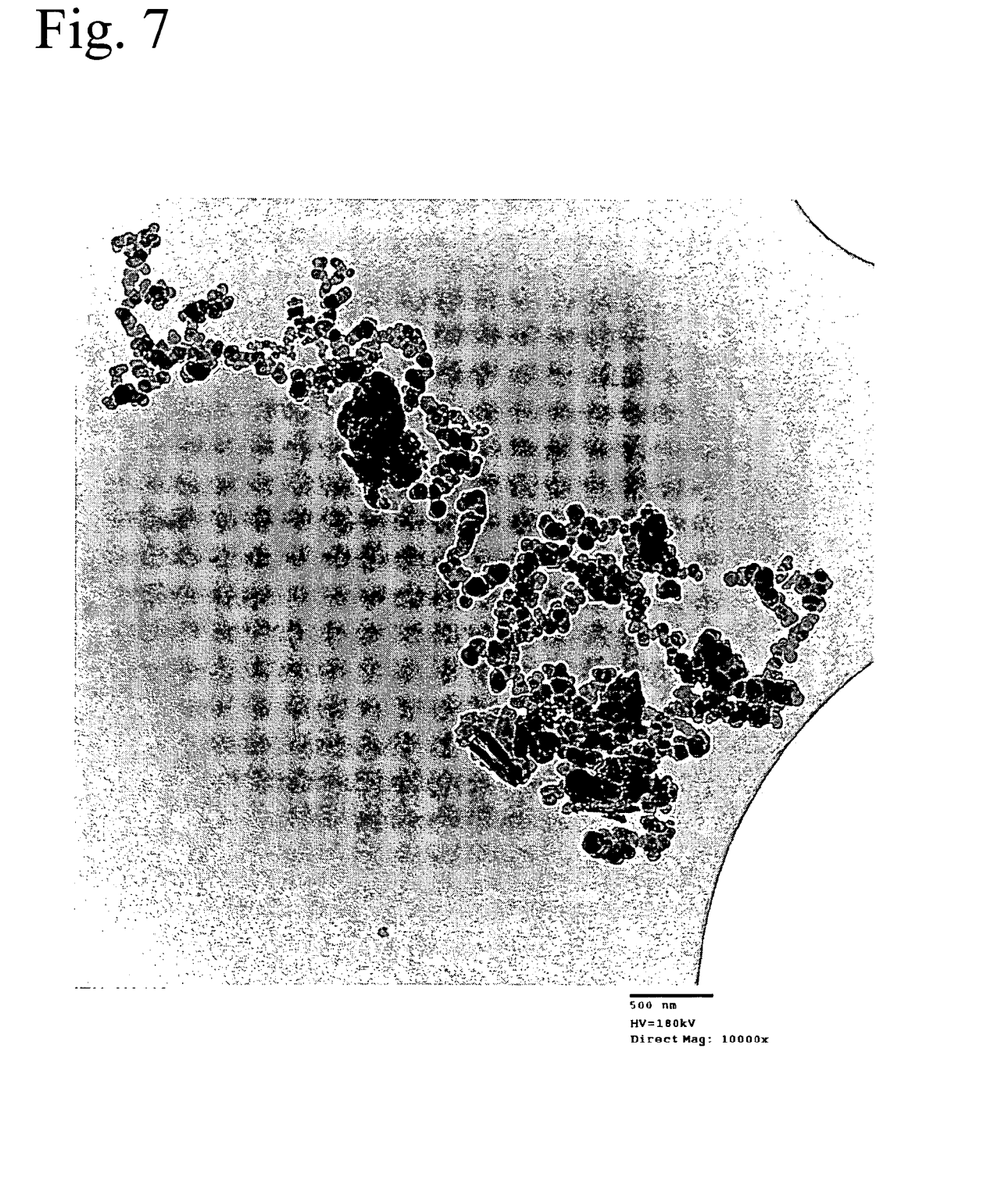
FIG. 7 shows a TEM image of the hybrid milled talc powder at 10,000× magnification.
Figure 8:
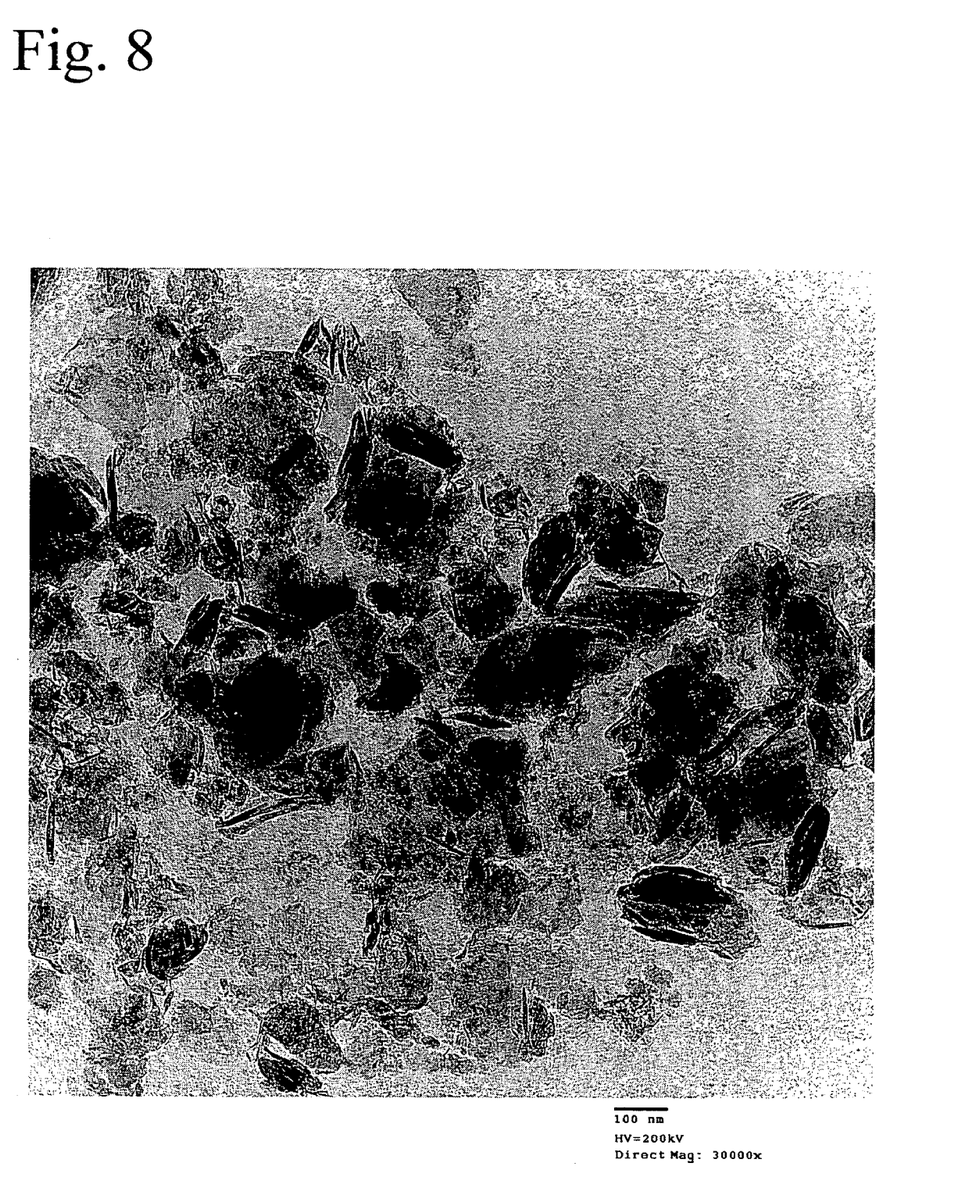
FIG. 8 shows a TEM image of the hybrid milled talc powder at 30,000× magnification.

Transmission electron microscope (TEM) images of the powder provided from hybrid milling are shown in FIG. 6-8. FIG. 6 is a wide field image of the hybrid-milled powder at 2500× magnification showing a few larger particles of about 1 μm in length and many smaller particles. FIG. 7 and FIG. 8, at 10,000× and 30,000× magnification show the 80 to about 100 nm particles that make up the substantial majority of the particles. Further images (not shown) indicate that the 1 μm particles are agglomerates of smaller particles.

In a further process step of the invention the aqueous nano-talc slurry from the hybrid milling or soaking method may be dried to give a dry flowable powder consisting essentially of about 99 to 99.5% talc. Any conventional drying method or series of methods may be used to provide the dry talc powder. For instance, a 100% thermal drying may be used or preferably a combination of mechanical dewatering followed by thermal dewatering may be used. Dewatering methods useful in serial drying include decantation, membrane filtration and centrifugal decantation. Drying methods that may be applied include flash drying, tray drying, spray drying, freeze drying, and fluidized bed drying. The drying may be carried out under ambient conditions or under vacuum. However, preferably the talc suspension, after mechanical dewatering, is dried in a two-step process wherein the first step rapidly removes the bulk of the moisture and the second step, over a longer residence time, removes the remaining moisture. For instance, a flash mill dryer, e.g. a Hosokowa Long Gap Mill, may be used to reduce the moisture content from about 50 wt % to about 5 wt %. The material is then transferred to a long residence time dryer that may reduce the moisture content of the nano-talc powder to about 0.5 wt %.

Other talc milling processes may achieve high surface areas comparable to those achieved with the hybrid milling process of the invention. For instance, talc may be milled in the presence of 1 to 16 parts of salt as a milling media to give a powder with a SSA of about 250 $m^2/g$ as described in the U.S. patent application publication No. 2003/0234304, Dec. 25, 2003, hereby incorporated by reference. However, the salt has to be removed by washing the talc with copious amounts of water that is an expensive and time-consuming process.

There is significant change in the attributes of talc upon treatment with the hybrid milling method. The aqueous talc slurry provided by the hybrid milling process does not settle to give a supernatant liquid, but rather remains a mud-like suspension for months. Gentle stirring results in shear thinning and breaks the suspension into an easily flowable liquid. Talc suspensions derived from the dry milling process, in comparison, settle into a supernatant water layer and a heavier talc fraction within a few minutes. Talc slurry from the soaking process settles within a few hours.

The hybrid milling method and soaking method provide a hydrophilic talc powder. As described earlier, talc is usually considered a hydrophobic mineral that disperses readily in organic solvents or polymers. However, the talc powder derived from hybrid milling disperses only marginally in organic solvents and very readily in water. Conventional dry milling of talc provides a material with the hydrophobic properties of conventional talc.

Figure 9:
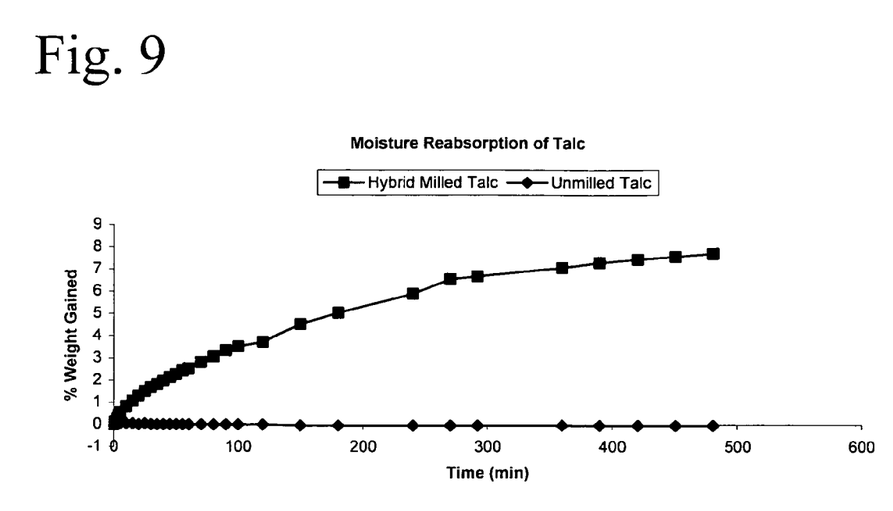
FIG. 9 compares the moisture uptake of conventional talc and the hydrophilic talc of the invention.

Talc usually has very little moisture associated with it. Dry milling of talc provides a product that has about 0.5 wt % water. The hydrophilic talc derived from the hybrid milling or soaking method absorbs up to about 5 wt % to about 15 wt % water over a period of twelve hours standing in air. FIG. 9 compares the moisture uptake of conventional talc and the hydrophilic talc of the invention.

Another embodiment of the invention is a hydrophilic talc consisting essentially of talc powder having a SSA of about 70 $m^2/g$ to about 500 $m^2/g$. More preferably, the hydrophilic nano-talc has a SSA of about 120 $m^2/g$ to about 400 $m^2/g$ and most preferably the hydrophilic nano-talc has a SSA of about 200 $m^2/g$ to about 400 $m^2/g$. The hydrophilic talc of the invention is further characterized by remaining suspended over a period of 1 month to about 3 months, when mixed with 2 to 5 parts of water. The hydrophilic talc of the invention may be further characterized by absorbing about 5 wt % to about 15 wt % water at about 40% to about 60% relative humidity.

Another embodiment of the invention is a hydrophilic nano-talc slurry comprising about 5 wt % to about 30 wt % talc powder of the invention and about 70 wt % to 95 wt % water. Preferably the nano-talc slurry comprises about 10 wt % to about 30 wt % talc powder and about 70 wt % to 90 wt % water, and most preferred is a nano-talc slurry with about 15 wt % to about 25 wt % talc and about 75 wt % to about 85 wt % water.

The following examples are meant to illustrate the invention and are not meant to limit the scope of the invention.

EXAMPLE 1

This example illustrates the increase in surface area when ground talc is further treated with water in a wet milling process.

UltraTalc™ 609 talc powder (800 g, Specialty Minerals Inc., initial SSA about 17 $m^2/g$, 0.9 um average particle size) and 4.8 mm yttria-stabilized zirconia balls (16 Kg, d=5.75 g/$cm^3$) were loaded into an Union Process 1-S Attritor with stainless steel tank and shaft and mechanically milled (energy input about 0.8 KW/h) with external water cooling for 3 hours at 350 rpm to provide a powder with an SSA of 113.8 $m^2/g$). Untreated tap water (2.5 L) was added to the tank and milling continued for another 3 hours. The slurry was discharged and dried in an oven (100° C., 12 h, in air). The resulting powder has an SSA of 295.1 $m^2/g$. The particle size is an average platelet diameter of about 80 to 100 nm as determined by TEM on a sample dispersed in methanol and deposited on a carbon grid.

A 20 cm deep sample of the talc slurry separated into about 1-2 mm water and 19.8-19.9 cm talc suspension over 3 months.

EXAMPLE 2

This example illustrates the increase in surface area when ground talc is soaked in water for a period of time.

UltraTalc™ 609 talc powder (800 g Specialty Minerals Inc., initial SSA about 17 $m^2/g$, 0.9 um average particle size) and 4.8 mm-yttria stabilized zirconia balls (16 Kg) were loaded into an Union Process 1-S Attritor with stainless steel tank and shaft and mechanically milled for 3 hours at 350 rpm. During milling, the tank was cooled by cycling water to room temperature. After discharging, the SSA of the powder was 110.2 $m^2/g$. The milled powder was mixed with untreated tap water (5 parts by weight), soaked for 16 hours, and then was dried in an oven (100° C., 12 h, in air). The resulting powder had an SSA of 263.5 $m^2$/gram. The particle size was about 80 to 100 nm as determined by TEM on a sample dispersed in methanol and deposited on a carbon grid.

A 5 cm deep sample of the talc slurry separated into 3 cm water and 2 cm talc sediment over a period of about 2 h.

EXAMPLE 3 (COMPARATIVE)

This example illustrates the increase in SSA of talc with dry milling with no additional processing.

UltraTalc™ 609 talc powder (800 g) and 4.8 mm yttria stabilized zirconia balls (16 Kg) were loaded into an Union Process 1-S Attritor with stainless steel tank and shaft and mechanically milled for 6 hours at 350 rpm. During milling, the tank was cooled by cycling water to room temperature. Samples were taken for surface area analysis at 1, 2, 3, and 6 h intervals. After discharging, the maximum surface area of the powder was 123.4 $m^2/g$. Particle size was measured by TEM to be 80~120 nm. The SSA at various intervals is plotted in FIG. 1 and shows the surface area levels off at about 125 $m^2/g$.

EXAMPLE 4 (COMPARATIVE)

This example illustrates the increase in SSA of talc with wet milling (water as the medium) with no additional processing.

UltraTalc™ 609 talc powder (800 g), 14.8 mm yttria stabilized zirconia balls (16 Kg) and untreated tap water (2.5 L) was loaded into an Union Process 1-S Attritor with stainless steel tank and shaft and mechanically milled for 8 hours at 350 rpm. Samples were taken for surface area analysis at the 2, 4 and 8 h intervals. During milling, the tank was cooled by cycling water. After discharging and drying in an oven the surface area of the powder was 121.4 $m^2/g$. Particle size was measured by TEM to be about 80 to about 100 nm. The SSA at various intervals is plotted in FIG. 1 and shows the surface area levels off at about 125 $m^2/g$.

EXAMPLE 5

This example describes the hybrid milling process with a 1 hr. milling time providing the results illustrated in FIG. 2.

Talc was milled for 1 h as described in example 1 providing a powder with an SSA of 71 $m^2/g$. After adding 2.5 liters of tap water, milling was continued for another 7 hours with a sample taken at 3 hours (SSA 141.5 $m^2/g$). The slurry was discharged and dried in an oven to provide a powder with a SSA of 180.5 m²/g and a particle size measured by TEM to be 120~170 nm.

EXAMPLE 6

This example describes the hybrid milling process with a 2 hr. milling time providing the results illustrated in FIG. 3.

Talc was milled for 2 h as described in example 1 providing a powder with an SSA of 103.26 m²/g. After adding 2.5 liters of tap water, milling was continued for another 6 hours with a sample taken at 2 h (SSA 210.64 m²/g). The slurry is discharged and dried in an oven to provide a powder with and SSA of 228.1 m²/g and a particle size measured by TEM to be 100~130 nm.

EXAMPLE 7

This example describes the hybrid milling process with a 3 hr. milling time providing the results illustrated in FIG. 4.

Figure 5:
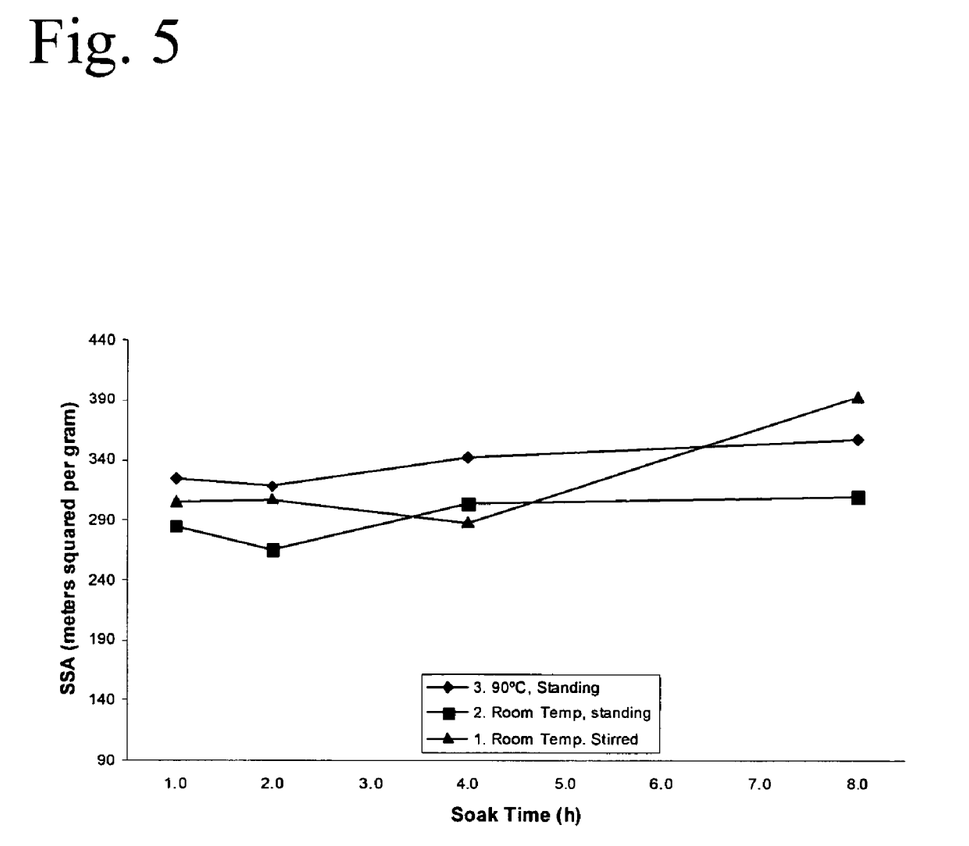
FIG. 5 illustrates the surface area of talc provided by the soaking method wherein the talc is first dry milled for 2.5 hours.

Talc was milled for 3 h as described in example 1 providing a powder with an SSA of 110.2 m²/g. After adding 2.5 liters of tap water, milling was continued for another 5 hours with samples taken at 1, 2, and 3 hours (SSA 277.1, 289.2 and 295.1 m²/g, respectively). The slurry was discharged and dried in an oven to provide a powder with a SSA of 331 m²/g and a particle size measured by TEM to be 80~100 nm. The TEM images of this sample are shown in FIG. 5-7.

EXAMPLE 8

UltraTalc™ 609 talc powder (12 Kg) and 5.0 mm yttria stabilized zirconia balls (277.5 Kg) were loaded into an Union Process 30-S Szegvari Attritor with stainless steel tank and shaft and mechanically milled for 4 hours at 135 rpm (about 45 KW hours energy input) to provide a powder with an SSA of 82.4 m²/g. De-ionized water (12 gallons) was added to the Attritor and milling continued for another 2 hours (about 22.5 KW hours energy input) to provide a hydrophilic nano-talc slurry (about 15 gallons) consisting of 19.6 wt % talc. A dried sample had an SSA of 199.7 m²/g.

EXAMPLE 9

This example illustrates the aqueous soaking method for making high surface area nano-talc.

UltraTalc™ 609 talc powder was dry milled for 2.5 h as described in example 1. The SSA of the powder was 95 m²/g. The milled talc was then mixed with de-ionized water (20 parts by weight) for vary amounts of time, under the following soak conditions: (1) room temperature, stirred at 1000 RPM; (2) room temperature, standing water; and (3) 90° C., standing water. Samples were drawn at 1, 2, 4, and 8 hours, and dried in an oven at 200° C. for SSA measurements. Table 1 lists the SSA results that are plotted in FIG. 5. It is evident from these that the addition of heat or mechanical energy to the soaking process increases the surface area relative to the ambient, unstirred process.

TABLE 1 lists the SSA for various soak methods over a period of times.

| Soak Conditions | Soak Time (hr) | Surface Area |
|---|---|---|
| 1. room temp, stirred | 1 | 305.50 |
| | 2 | 307.11 |
| | 4 | 288.13 |
| | 8 | 392.39 |
| 2. room temp, standing | 1 | 284.87 |
| | 2 | 264.76 |
| | 4 | 303.91 |
| | 8 | 309.60 |
| 3. 90 C., standing | 1 | 324.60 |
| | 2 | 317.78 |
| | 4 | 342.58 |
| | 8 | 357.41 |

EXAMPLE 10

This example illustrates the hydrophilic nature of high surface area nano-talc of the invention in comparison with commercial grade talc.

A sample of the talc slurry provided from example 1 was dried at 200° C. until no further weight loss was exhibited in a Mettler-Toledo HR83P moisture balance. The resultant material was then ground in a mortar and pestle, and re-dried in the same manner as before. The powder was allowed to cool in a vacuum desiccator, then placed on a tared balance and monitored for moisture weight gain at a relative humidity of about 49%. This was also repeated from the drying steps with unmilled UltraTalc® 609 powder. The weight gain of hybrid-milled and unmilled samples is plotted in FIG. 9 and illustrates the significantly greater moisture absorption of the hybrid-milled product of the invention.

It is understood that the above-described embodiments of the invention are illustrative only and modification thereof may occur to those skilled in the art. Accordingly, it is desired that this invention is not to be limited to the embodiments disclosed herein but is to be limited only as defined by the appended claims and their legal equivalents.

What is claimed is:

1. A hydrophilic nano-talc composition obtained by hybrid milling, said composition consisting essentially of talc powder with a specific surface area of about 70 m²/g to about 500 m²/g and a particle size measured by TEM of about 80 to about 170 nm.

2. A hydrophilic nano-talc composition of claim 1 wherein the talc powder has a specific surface area of about 200 m²/g to about 400 m²/g.

3. A hydrophilic nano-talc composition of claim 2 further characterized by absorbing about 5 to about 15 wt % talc powder water at about 40% to about 60% relative humidity.

4. A hydrophilic nano-talc composition of claim 1 further characterized by absorbing about 5 to about 15 wt % water at about 40 to about 60% relative humidity.

5. A hydrophilic nano-talc slurry obtained by hybrid milling, said nano-talc slurry comprising about 5 to about 30 wt % talc powder and about 70 to 95 wt % water, wherein the talc powder has a specific surface area of about 70 m²/g to about 500 m²/g and a particle size measured by TEM of about 80 to about 170 nm.

6. A hydrophilic nano-talc slurry of claim 5 further characterized by remaining suspended over a period of 1 month to about 3 months.

7. A hydrophilic nano-talc slurry of claim 5 comprising about 10 to about 30 wt % talc powder and about 70 to 90 wt % water.

8. A hydrophilic nano-talc slurry of 7, wherein the talc powder has a specific surface area of about 200 $m^2/g$ to about 400 $m^2/g$.

9. A hydrophilic nano-talc slurry of claim 5 wherein the talc powder has a specific surface area of about 200 $m^2/g$ to about 400 $m^2/g$.

10. A hydrophilic nano-talc slurry of claim 9 further characterized by remaining suspended over a period of 1 month to about 3 months.

\* \* \* \* \*